(12) United States Patent
Fujii

(10) Patent No.: US 11,488,547 B2
(45) Date of Patent: Nov. 1, 2022

(54) LIGHT FLUX CONTROLLING MEMBER, LIGHT-EMITTING DEVICE, SURFACE LIGHT SOURCE DEVICE AND DISPLAY DEVICE

(71) Applicant: Enplas Corporation, Saitama (JP)

(72) Inventor: Yuki Fujii, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 0 days.

(21) Appl. No.: 17/209,555

(22) Filed: Mar. 23, 2021

(65) Prior Publication Data
US 2022/0310026 A1 Sep. 29, 2022

(51) Int. Cl.
*G09G 3/34* (2006.01)
*G02F 1/13357* (2006.01)

(52) U.S. Cl.
CPC ..... *G09G 3/3426* (2013.01); *G02F 1/133603* (2013.01); *G02F 1/133606* (2013.01); *G09G 2320/0626* (2013.01)

(58) Field of Classification Search
CPC .......... G09G 3/3426; G09G 2320/0626; G02F 1/133606; G02F 1/133603
See application file for complete search history.

(56) References Cited

U.S. PATENT DOCUMENTS

| | | | |
|---|---|---|---|
| 2009/0003002 A1* | 1/2009 | Sato | G02B 6/0043 362/341 |
| 2014/0056007 A1* | 2/2014 | Chou | G02B 19/0066 |
| 2017/0212386 A1* | 7/2017 | Fuji | G02F 1/133603 |

FOREIGN PATENT DOCUMENTS

CN 110208984 A 9/2019

* cited by examiner

*Primary Examiner* — Towfiq Elahi
(74) *Attorney, Agent, or Firm* — Brundidge & Stanger, P.C.

(57) ABSTRACT

Provided is light flux controlling member for controlling a distribution of light emitted from a plurality of light emitting elements disposed on a substrate, which includes a plurality of incidence units for allowing incidence of the light emitted from the plurality of light emitting elements, respectively; and an emission unit which emits the light incident on the plurality of incidence units while guiding the light, and which is disposed between the plurality of incidence units in a direction along the substrate. The light flux controlling member has a rectangular shape with rounded corners in plan view, and includes four corner portions and four side portions, and the inclination angle of the corner portions is different from the inclination angle of the side portions.

8 Claims, 9 Drawing Sheets

LIGHT FLUX CONTROLLING MEMBER, LIGHT-EMITTING DEVICE, SURFACE LIGHT SOURCE DEVICE AND DISPLAY DEVICE

TECHNICAL FIELD

The present invention relates to a light flux controlling member, a light emitting device, a surface light source device, and a display device.

BACKGROUND ART

In recent years, a direct surface light source device including a plurality of light emitting elements as a light source is used in transmission image display devices such as liquid crystal displays. A large number of light emitting elements may be disposed to illuminate a wide range with light.

Patent Literature (hereinafter, referred to as PTL) 1 discloses a light flux controlling member (microarray lens) suitable for being disposed over a plurality of light emitting elements. A plurality of lenses are connected by a support plate in these microarray lenses, and one microarray lens is disposed above the plurality of light emitting elements (mini LEDs) disposed on a substrate. This configuration eliminates the necessity to dispose lenses individually above corresponding light emitting elements, and improves the handling property at the time of mounting to facilitate the mounting.

CITATION LIST

Patent Literature
PTL 1
Chinese Patent Application Publication No. 110208984

SUMMARY OF INVENTION

Technical Problem

In a surface light source device including thereon a large number of light flux controlling members disposed above the plurality of light emitting elements as described above, the present inventors have made attempt to increase the distance between the light flux controlling members to reduce the number of light emitting elements, In order to reduce the number of light emitting elements, it is considered necessary to expand light from each light emitting element to a wider range by a light flux controlling member.

From the above viewpoint, the present inventors have examined the expansion of light by disposing one light flux controlling member above four light emitting elements 220, and turning only one light emitting element 220 at the lower right of the four light emitting elements 220 on, in a surface light source device as illustrated in FIG. 1A, The present inventors have found out that on the light emitting surface (light diffusion plate) of the surface light source device, the luminance due to the light emitted from corner portion 10 located far from the lit light emitting element 220 in the light flux controlling member significantly differ from the luminance due to the light emitted from side portion 20 located far from the lit light emitting element 220 in the light flux controlling member as illustrated in FIG. 1B.

Specifically, the example illustrated in FIGS. 1A and 1B indicates that the luminance in a region corresponding to corner portion 10 tends to be comparatively low, and the luminance in a region corresponding to side portion 20 tends to be comparatively high. When the luminance in the region corresponding to corner portion 10 is relatively low as described above, it is difficult to increase the distance between the light flux controlling members because the luminance unevenness occurs as the distance between the light flux controlling members increases.

An object of the present invention is to provide a light flux controlling member which is to be disposed above a plurality of light emitting elements in a surface light source device, and which can reduce the difference between the luminance of a region corresponding to a corner portion of the light flux controlling member and the luminance of a region corresponding to a side portion of the light flux controlling member in the surface light source device. Another object of the present invention is to provide a light emitting device, a surface light source device, and a display device which include the light flux controlling member.

Solution to Problem

A light flux controlling member of the present invention is for controlling a distribution of light emitted from a plurality of light emitting elements disposed on a substrate, and includes: a plurality of incidence units for allowing incidence of the light emitted from the plurality of light emitting elements, respectively; and an emission unit which is disposed between the plurality of incidence units in a direction along the substrate, and which emits the light incident on the plurality of incidence units while guiding the light, in which the plurality of incidence units each include an incidence surface which is disposed on a back side of the light flux controlling member, and which allows incidence of the light emitted from the light emitting element, and a reflection surface which is disposed on a front side of the light flux controlling member at a position facing the light emitting element with the incidence surface interposed between the reflection surface and the light emitting element, and which reflects the light incident on the incidence surface in a lateral direction in such a way that the reflected light travels away from an optical axis of the light emitting element, in which the light flux controlling member has a rectangular shape with rounded corners in plan view, and includes four corner portions and four side portions, and in which a minimum angle of a first inclination angle is different from a minimum angle of a second inclination angle, where the first inclination angle is, with respect to the substrate, an inclination angle of a side surface adjacent to the front side in a side surface of the light flux controlling member when the corner portion is observed in a cross section including the optical axis, and the second inclination angle is, with respect to the substrate, an inclination angle of the side surface adjacent to the front side in the side surface of the light flux controlling member when the side portion is observed in a cross section including the optical axis.

Alight emitting device of the present invention includes a plurality of light emitting elements disposed on a substrate, and the above-described light flux controlling member disposed on or above the plurality of light emitting elements.

A surface light source device of the present invention includes a plurality of the above-described light emitting devices and a light diffusion plate that transmits light emitted from the plurality of light emitting devices while diffusing the light.

A display device of the present invention includes the above-described surface light source device and a display member to be illuminated with light emitted from the surface light source device.

Advantageous Effects of Invention

The present invention can provide a light flux controlling member capable of reducing the generation of luminance unevenness in a surface light source device caused by the difference between the luminance of a region corresponding to a corner portion of a light flux controlling member and the luminance of a region corresponding to a side portion of the light flux controlling member.

The present invention can also provide a light emitting device, a surface light source device, and a display device which include at least one above-described light flux controlling member.

BRIEF DESCRIPTION OF DRAWINGS

FIGS. 1A and 1B are diagrams for explaining a luminance distribution when one of a plurality of light emitting elements disposed under a light flux controlling member is turned on;

DESCRIPTION OF EMBODIMENTS

Hereinafter, one or more embodiments of the present invention will be described in detail with reference to the drawings. In the following description, a surface light source device suitable for a backlight of a liquid crystal display device or the like will be described as a typical example of the surface light source device according to the present invention. Such a surface light source device can be used as display device 100' in combination with display member 102 (such as a liquid crystal panel) which is to be illuminated with light from the surface light source device (see FIG. 2B).

(Configurations of Surface Light Source Device and Light Emitting Device)

Figure 1A:
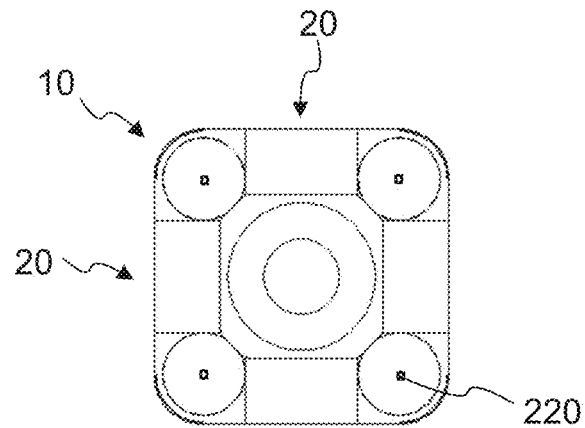
Figure 1B:
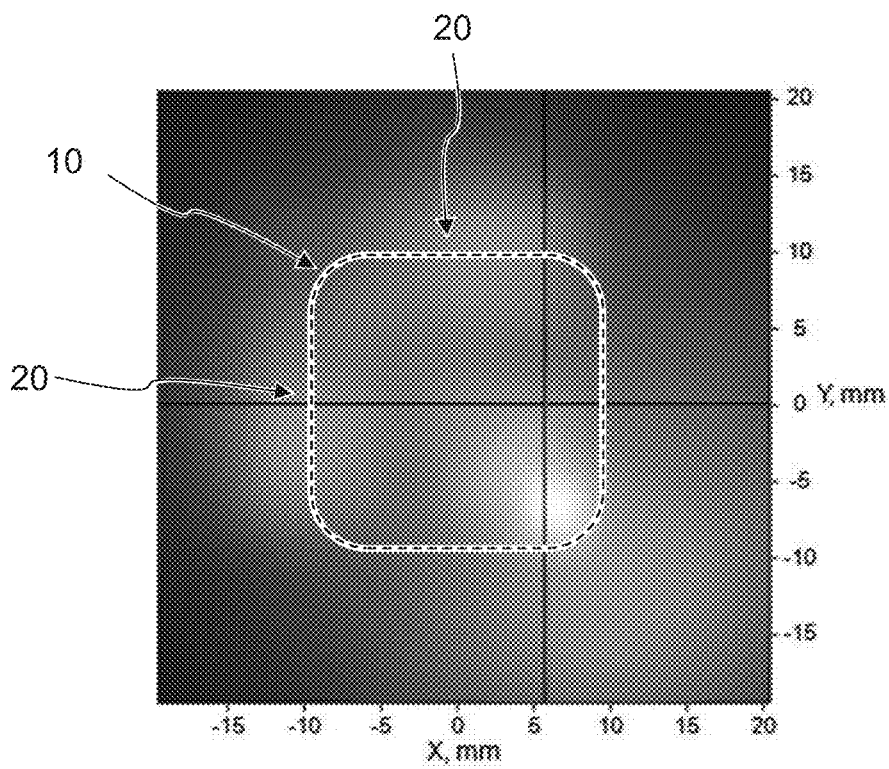
Figure 2A:
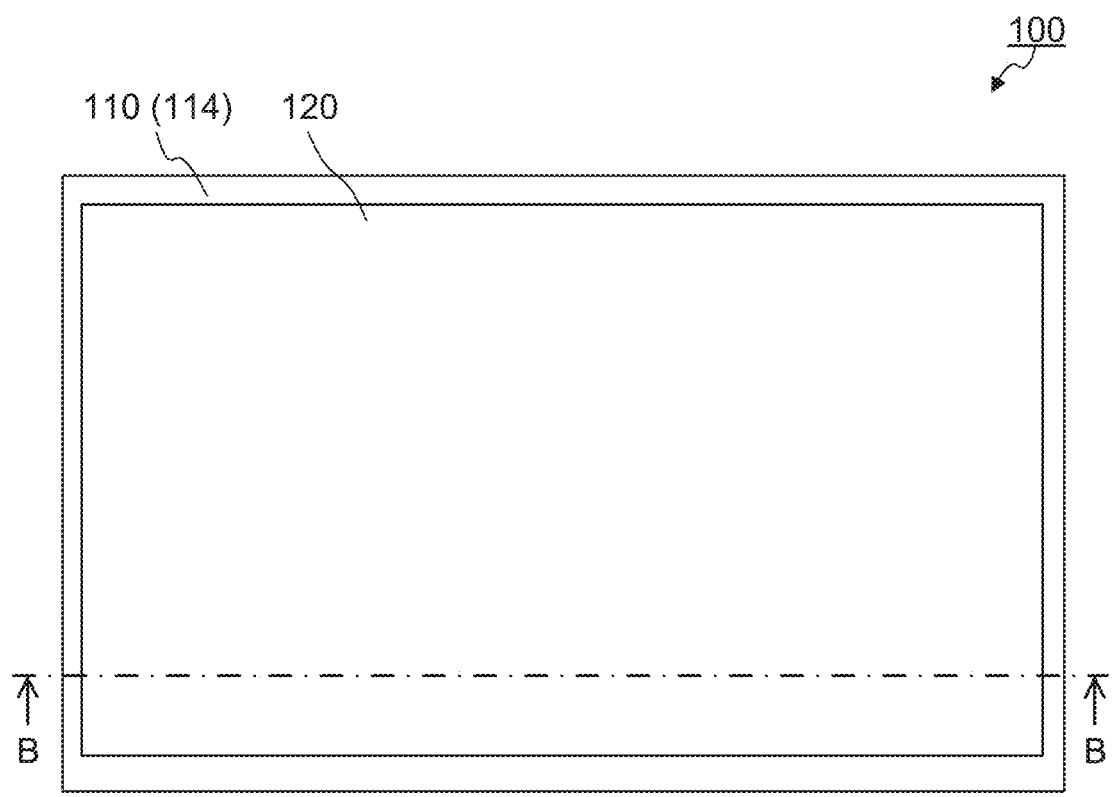
FIGS. 2A and 2B illustrate a surface light source device according to an embodiment.
Figure 2B:
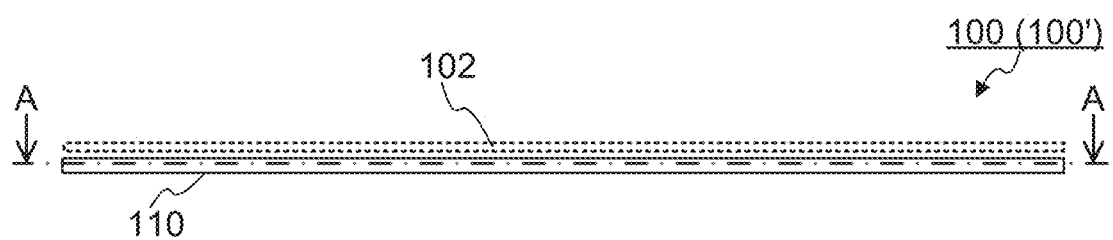
Figure 3A:
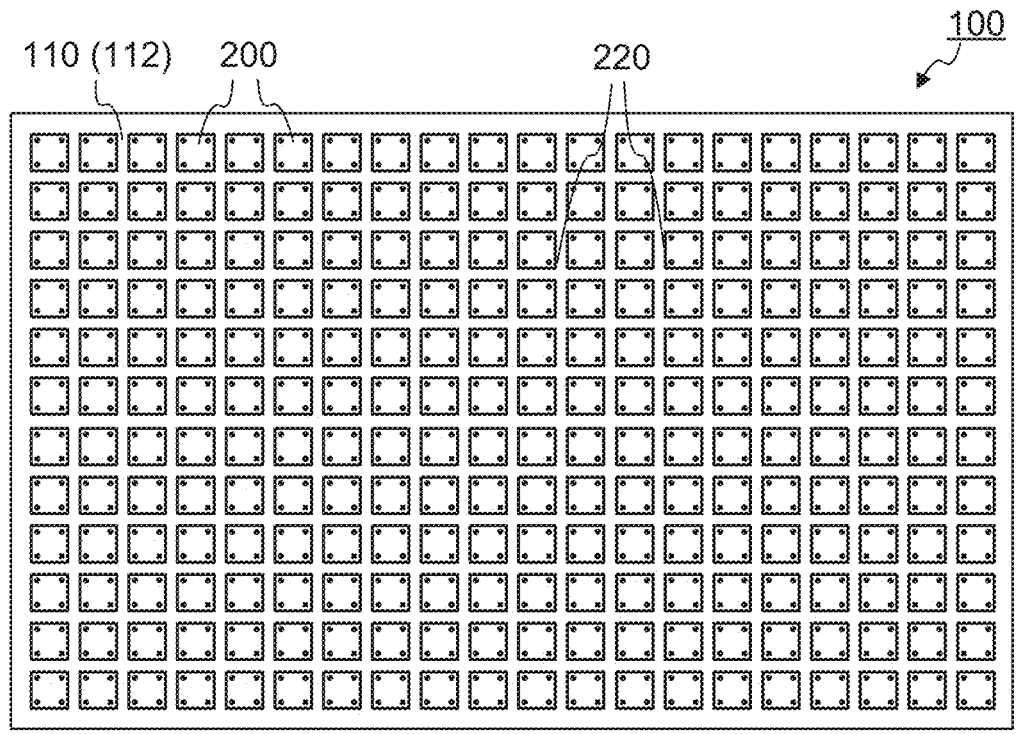
FIGS. 3A and 3B are cross-sectional views of the surface light source device according to the embodiment.
Figure 3B:
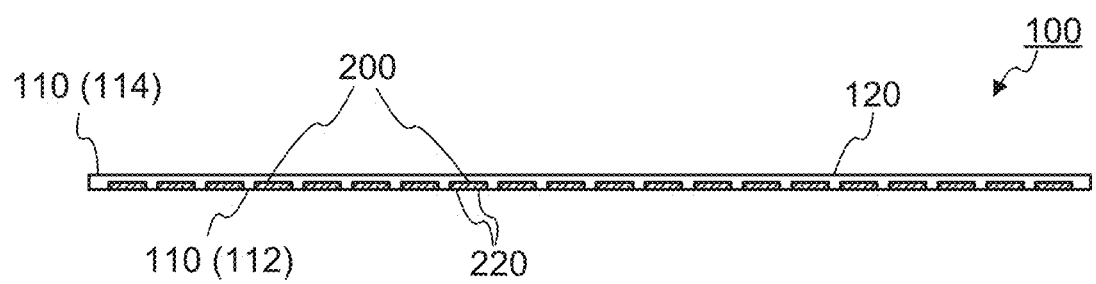
Figure 4:
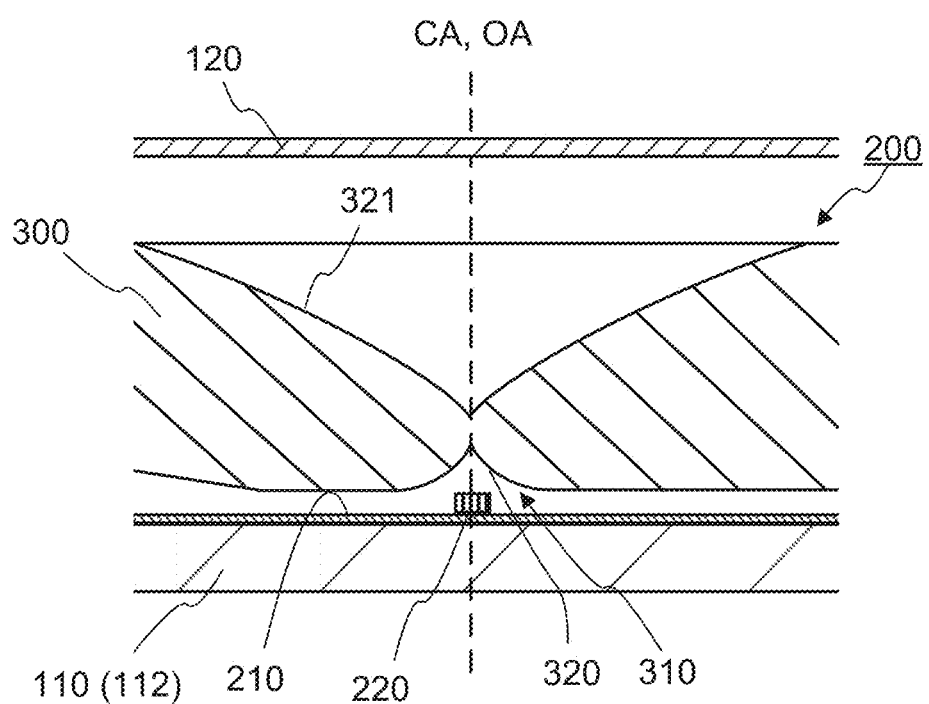
FIG. 4 is a partially enlarged cross-sectional view of FIG. 3B.

FIGS. 2A and 2B illustrate a configuration of surface light source device 100 according to the embodiment of the present invention. FIG. 2A is a plan view, and FIG. 2B is a front view. FIG. 2A is a cross-sectional view taken along line A-A of FIG. 2B, and FIG. 3B is a cross-sectional view taken along line B-B of FIG. 2A. FIG. 4 is a partially enlarged cross-sectional view illustrating an enlarged part of FIG. 3B.

As illustrated in FIGS. 2A to 3B, surface light source device 100 according to the present embodiment (first embodiment) includes casing 110, a plurality of light emitting devices 200, and light diffusion plate 120. The plurality of light emitting device 200 are disposed in a grid pattern (in a matrix) on bottom plate 112 of casing 110. The inner surface of bottom plate 112 functions as a diffusive reflection surface. Top plate 114 of casing 110 is provided with an opening. Light diffusion plate 120 is disposed to close the opening, and functions as a light emitting surface. The light emitting surface may have any size which is, for example, about 400 mm×about 700 mm.

As illustrated in FIG. 4, light emitting device 200 is fixed on substrate 210. Substrate 210 is fixed at a predetermined, position on bottom plate 112 of casing 110. Each light emitting device 200 includes at least one light emitting element 220 and light flux controlling member 300.

Light emitting element 220 is a light source of surface light source device 100 and is mounted on substrate 210. Light emitting element 220 is, for example, a light emitting diode (LED). Light emitting element 220 may be of any type, For example, light emitting element 220 (for example, COB type light emitting diode) which emits light from the top surface and side surface(s) is suitably used in light emitting device 200 according to the embodiment of the present invention. The color of light emitting element 220 may be any color, such as white, blue, and RGB. The size of light emitting element 220 is not limited, and is preferably 0.1 mm to 0.6 mm, more preferably 0.1 mm to 0.3 mm.

Light flux controlling member 300 is an optical member for controlling the distribution of light emitted from at least one light emitting element 220, and is fixed on substrate 210. As described below, light flux controlling member 300 includes a plurality of incidence units 310, and light flux controlling member 300 preferably disposed above a plurality of light emitting elements 220 in such a way that central axis CA of each incidence unit 310 (incidence surface 320) coincides with optical axis OA of corresponding light emitting element 220. In light flux controlling member 300 according to the present embodiment, incidence unit 310 (incidence surface 320 and first reflection surface 321) of light flux controlling member 300 is rotationally symmetric. The rotation axis of incidence unit 310 is referred to as "central axis CA of incidence unit 310, incidence surface 320 or first reflection surface 321." In addition, "optical axis OA of light emitting element 220" means a central light beam of a stereoscopic emission light flux from light emitting element 220. A gap for releasing the heat generated from light emitting element 220 to the outside may or may not be formed between substrate 210 with light emitting element 220 mounted thereon and the back surface of light flux controlling member 300.

Light flux controlling member 300 is formed by integral molding. The material of light flux controlling member 300 may be any material that allows light with a desired wavelength to pass therethrough. The material of light flux controlling member 300 is, for example, an optically transparent resin such as polymethylmethacrylate (PMMA), a polycarbonate (PC), or an epoxy resin (EP), or glass.

Surface light source device 100 according to the present embodiment has its main feature in the configuration of light flux controlling member 300. Light flux controlling member 300 will thus be separately described below in detail.

Light diffusion plate 120 is a plate-shaped member having a light diffusing property, and transmits light emitted from light emitting device 200 while diffusing the light. Normally, the size of light diffusion plate 120 is substantially the same as that of the display member such as a liquid crystal panel. Light diffusion plate 120 is formed of, for example, an optically transparent resin such as polymethylmethacrylate (PMMA), a polycarbonate (PC), polystyrene (PS), or a styrene-methylmethacrylate copolymer resin (MS). In order to provide a light diffusing property, minute irregularities are formed in the surface of light diffusion plate 120, or light diffusing members such as beads are dispersed inside light diffusion plate 120.

In surface light source device 100 according to the present embodiment, light emitted from each light emitting element 220 is expanded by light flux controlling member 300 so as to illuminate a wide range of light diffusion plate 120. The light emitted from each light flux controlling member 300 is further diffused by light diffusion plate 120, Surface light source device 100 according to the present embodiment can thus uniformly illuminate a plane-shaped display member (for example, a liquid crystal panel).

(Configuration of Light Flux Controlling Member)

Figure 5A:
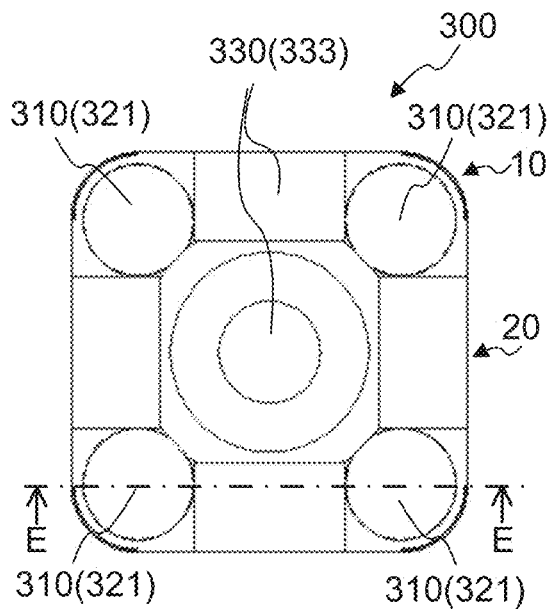
FIGS. 5A to 5E illustrate a light flux controlling member according to the embodiment.
Figure 5B:
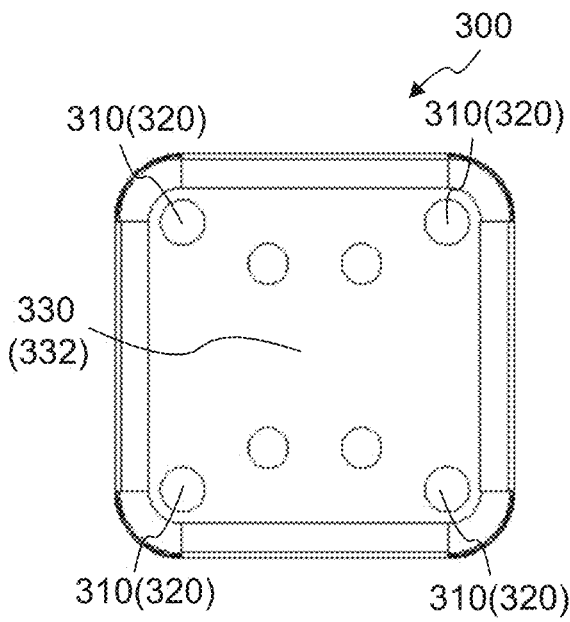
Figure 5C:
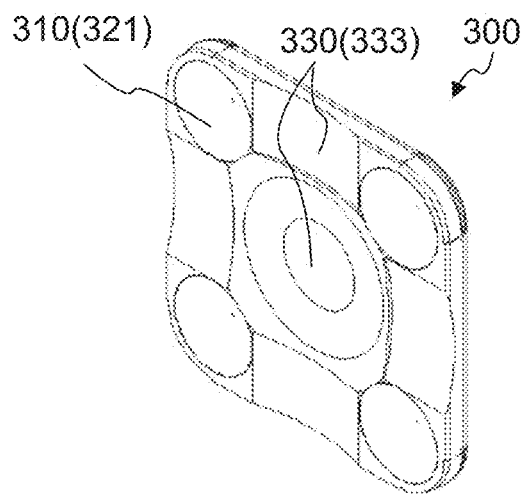
Figure 5D:
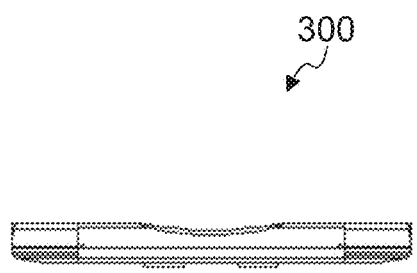
Figure 5E:
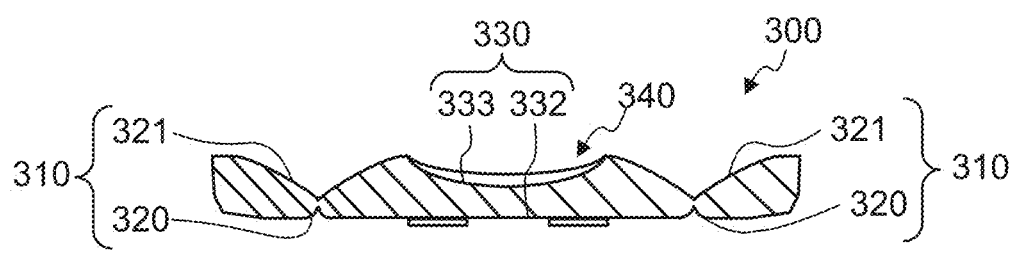
Figure 6A:
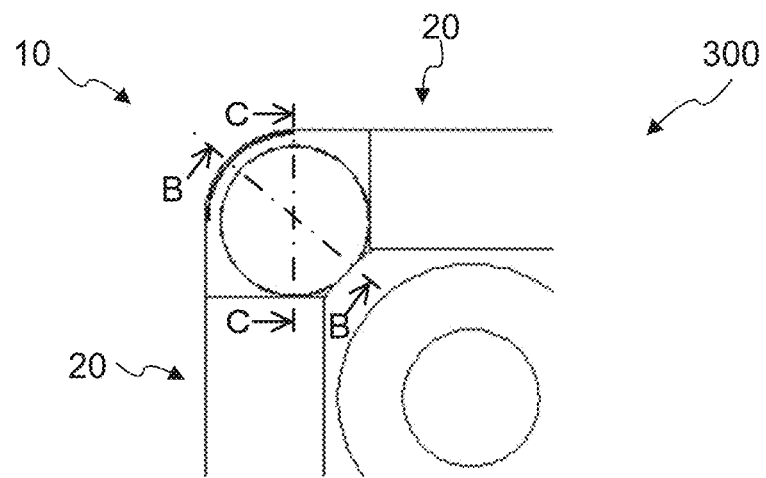
FIGS. 6A to 6C illustrate the light flux controlling member according to the embodiment.
Figure 6B:
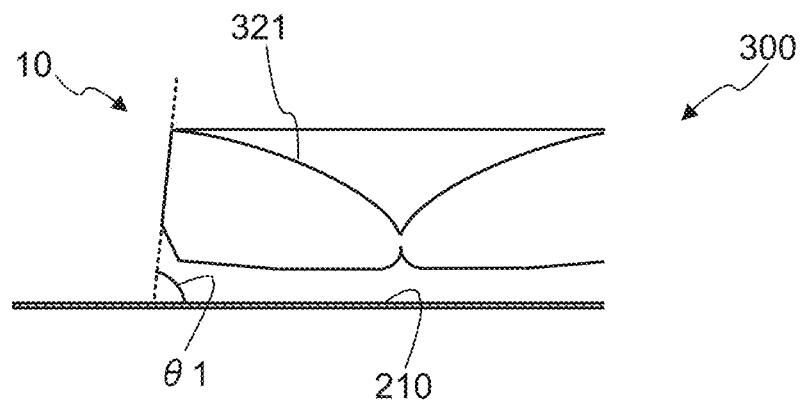
Figure 6C:
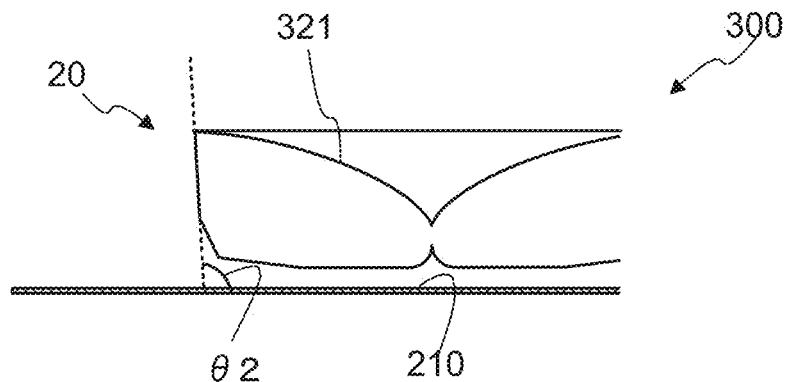

FIG. 5A is a plan view of light flax controlling member 300 according to the embodiment, FIG. 5B is a bottom view of light flux controlling member 300, FIG. 5C is a perspective view of light flux controlling member 300, FIG. 5D is a side view of light flux controlling member 300, and FIG. 5E is a cross-sectional view taken along line E-E of FIG. 5A. FIG. 6A is a partially enlarged view of FIG. 5A, and FIGS. 6B and 6C are cross-sectional views taken along respective line B-B and line C-C of FIG. 6A. In FIGS. 6B and CC, hatching is omitted. Hereinafter, the configuration of light flux controlling member 300 according to the embodiment will be described.

As illustrated in FIG. 5A, light flux controlling member 300 has a rectangular shape with rounded corners in plan view, and includes four corner portions 10 and four side portions 20. The portion that has a shape of an arc in plan view is corner portion 10, and the portion that has a shape of a straight line in plan view is side portion 20 in the present embodiment.

As illustrated in FIGS. 5A to 5E, light flux controlling member 300 according to the present embodiment is for controlling the distribution of light emitted from a plurality of light emitting elements 220 disposed on substrate 210, and light flux controlling member 300 includes a plurality of incidence units 310 and at least one emission unit 330. Plurality of incidence units 310 are disposed in a grid pattern corresponding to the arrangement of light emitting elements 220. Emission unit 330 is disposed between incidence units 310 in the direction along substrate 210.

Each of the incidence units 310 allows thereon incidence of light emitted from corresponding light emitting element 220. Incidence unit 310 includes incidence surface 320 that allows thereon incidence of light emitted from light emitting element 220, and first reflection surface 321 that reflects the light incident on incidence surface 320 toward emission unit 330.

Incidence surface 320 is disposed on the back side of light flux controlling member 300 and is an inner surface of a recess formed at a position facing light emitting element 220. Incidence surface 320 allows the majority of light emitted from light emitting element 220 to enter light flux controlling member 300, while controlling the travelling direction of the light. Incidence surface 320 intersects optical axis OA of light emitting element 220 and is rotationally symmetric (circular symmetric) about optical axis OA. Incidence surface 320 may have any shape which is set in such a way that the light incident on incidence surface 320 is directed to first reflection surface 321 and first emission surface 333. In the present embodiment, incidence surface 320 has a shape such that the distance of the surface from substrate 210 gradually decreases as the distance of the surface from optical axis OA of light emitting element 220 increases.

First reflection surface 321 is disposed on the front side of light flux controlling member 300 at a position facing light emitting element 220 with incidence surface 320 interposed therebetween, and reflects the light incident on incidence surface 320 in the lateral direction in such a way that the reflected light travels away from optical axis OA of light emitting element 220. Herein, the lateral direction does not mean a direction toward the outer edge of the light flux controlling member, but means any direction directed outward in the radial direction 360° about the optical axis. The lateral direction does not refer to only light in a direction completely parallel to the substrate. For example, when the light parallel to the substrate is at 0°, light whose central light from the light emitting element is reflected at 0°±15° so as to travel away from the optical axis is also included.

First reflection surface 321 thus can prevent light incident on incidence surface 320 from escaping upward, thereby preventing the generation of a bright part directly above light emitting element 220, and can also guide the light between light emitting elements 220. thereby preventing the generation of a dark part between light emitting elements 220. Further, a part of the light reflected by first reflection surface 321 reaches the front side part of the side surface in corner portion 10 and is emitted to the outside. First reflection surface 321 may have any shape as long as the light incident on incidence surface 320 is laterally reflected. First reflection surface 321 may be configured, for example, to be rotationally symmetric (circularly symmetric) about optical axis OA of light emitting element 220, and to approach the front side (away from the substrate 210) as the distance of the surface from optical axis OA of light emitting element 220 increases.

The generatrix from the central portion to the outer peripheral portion of this rotationally symmetric surface is a. curved line or a straight line inclined with respect to the optical axis of light emitting element 220. First reflection surface 321 is a concave surface in a state where the generatrix is rotated by 360° with central axis CA of incidence surface 320 as a rotation axis.

In the present embodiment, incidence surface 320 and first reflection surface 321 are each an inner surface of a recess, and the area of the opening edge of the recess forming the first reflection surface is preferably 0.5 to 2.0 times, more preferably 0.5 to 1.5 times, and particularly preferably 0.5 to 1.3 times, the area of the opening edge of the recess forming the incidence surface, in plan view.

Emission unit 330 emits light incident on the plurality of incidence units 310 while guiding the light. A part of the light guided through emission unit 330 reaches the side surface in side portion 20 and is emitted to the outside. In the present embodiment, when four incidence units 310 are disposed at individual corners of a virtual quadrangle, light flux controlling member 300 includes four emission units 330 disposed at positions corresponding to the four sides of the virtual quadrangle in such a way that each emission unit is disposed along the corresponding side, and also one emission unit 330 disposed so as to be surrounded by the virtual quadrangle. As illustrated in FIG. 5E, each emission unit 330 includes second reflection surface 332 which is disposed on the back side of light flux controlling member 300, and which reflects light from first reflection surface 321 of incidence unit 310. Emission unit 330 also includes first emission surface 333 which is disposed on the front side of light flux controlling member 300 so as to face second reflection surface 332, and which reflects a part of the light from incidence unit 310 and emits another part of the light.

In addition, emission unit 330 includes emission promotion part 340 for promoting the emission of light traveling between second reflection surface 332 and first emission surface 333 in the present embodiment. Emission promotion part 340 is disposed at at least one of second reflection surface 332 and first emission surface 333.

As illustrated in FIG. 5E, emission promoting part 340 is formed at first emission surface 333, and the distance between first emission surface 333 and second reflection surface 332 decreases as the distance of the surfaces from incidence unit 310 increases in the present embodiment. Such a configuration allows the light guided from incidence unit 310 to be emitted more readily from first emission surface 333 as the distance from incidence unit 310 increases.

First emission surface 333 may have any shape. In the present embodiment, four first emission surfaces 333 disposed at positions corresponding to the four sides of the virtual quadrangle are each a concave surface having a curvature in the direction along the corresponding side of the virtual quadrangle and no curvature in the direction perpendicular to this side (see FIGS. 5A to 5E). First emission surface 333 disposed so as to be surrounded by the virtual quadrangle is a concave surface formed by the upper bottom and a part of the side surface of a truncated cone disposed upside down (see FIG. 5C).

In light flux controlling member 300 according to the present embodiment as illustrated in FIGS. 6A, 6B and 6C, minimum angle θ1 of a first inclination angle is different from minimum angle θ2 of a second inclination angle. Herein, the first inclination angle is, with respect to substrate 210, the inclination angle of a side surface adjacent to the front side in the side surface of light flux controlling member 300 when corner portion 10 is observed in any cross section including the optical axis of light emitting element 220 (a cross section perpendicular to substrate 210), and the second inclination angle is, with respect to substrate 210, the inclination angle of the side surface adjacent to the front side in the side surface of light flux controlling member 300 when side portion 20 is observed in any cross section including the optical axis. When the side surface adjacent to the front side is a flat surface, the minimum angles of the first inclination angle and the second inclination angle are the angles of the flat surface with respect to the substrate. When the side surface adjacent to the front side is a curved surface, θ1 and θ2 can be each calculated by measuring the angle between the substrate and a line connecting points when the curved line is viewed in cross section at the micro level. The side surface adjacent to the front side does not include, for example, a chamfered surface (such as rounded surface and chamfered surface) formed by processing or the like, for example, a surface having a radius of 0.3 mm or less. The distribution of light emitted from corner portion 10 and the distribution of light emitted from side portion 20 thus can be made different. In the above cross sections, minimum angle θ1 of the first inclination angle and minimum angle θ2 of the second inclination angle are each an angle on the light flux controlling member 300 side among the two angles formed by the tangent line of the side surface adjacent to the front side and the surface of substrate 210. That is, when the side surface is an inclined surface (flat surface or curved surface) toward the center side of light flux controlling member 300 as the side surface approaches the front side, the inclination angle is less than 90°, and when the side surface is an inclined surface (flat surface or curved surface) toward the center side of light flux controlling member 300 as the side surface approaches the back side, the inclination angle is more than 90°.

In the present embodiment, minimum angle θ1 of the first inclination angle is smaller than minimum angle θ2 of the second inclination angle, where the first inclination angle is the inclination angle of a side surface adjacent to the front side in the side surface in corner portion 10 with respect to the substrate, and the second inclination angle is the inclination angle of the side surface adjacent to the front side in the side surface in side portion 20 with respect to the substrate. Specifically, minimum angle θ1 of the first inclination angle is preferably 60 to 110°, and minimum angle θ2 of the second inclination angle is preferably 70 to 120°. When the reflection surface in the present invention reflects light incident on the incidence surface in the lateral direction substantially parallel to the substrate in such a way that the reflected light travels away from the optical axis of the light emitting element, minimum angle θ1 of the first inclination angle of the front side part of the side surface in corner portion 10 is preferably 60 to 85°, and minimum angle θ2 of the second inclination angle of the front side part of the side surface in side portion 20 is preferably 70 to 90°. It is preferable that the following relational expression is satisfied. That is, the expression 2°≤the minimum angle of the second inclination angle—the minimum angle of the first inclination angle ≤30° is preferably satisfied. The above configuration allows light emitted from corner portion 10 to reach the diffusion and reflection surface (the inner surface of bottom plate 112 of casing 110 or the surface of substrate 210 disposed on the inner surface) at a region close to light flux controlling member 300, thereby preventing a decrease in the luminance of a region corresponding to corner portion 10 on the light emitting surface (light diffusion plate 120) of surface light source device 100.

The cross-sectional shapes of the side surface in corner portion 10 may all be the same or may differ according to the position of the cross section. In the present embodiment the cross-sectional shapes of the side surface in corner portion 10 are the same. The cross-sectional shapes of the side surface in side portion 20 may all be the same or may differ according to the position of the cross section. In the present embodiment, the cross-sectional shapes of the side surface in side portion 20 are the same.

From another point of view, the inclination of the side surface, to which the light reflected by the reflection surface (first reflection surface 321) reaches, differs between corner portion 10 and side portion 20 in light flux controlling member 300 according to the present embodiment. The average inclination angle in corner portion 10 is smaller than the average inclination angle in side portion 20.

Figure 7A:
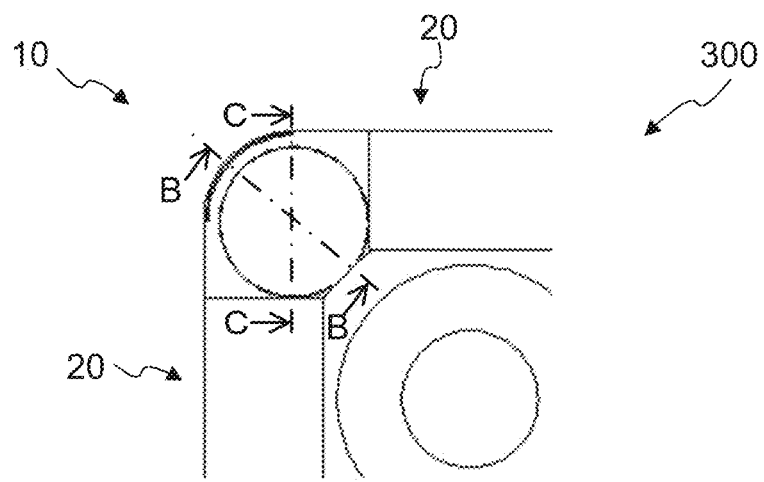
FIGS. 7A to 7C illustrate a light flux controlling member according to another embodiment.
Figure 7B:
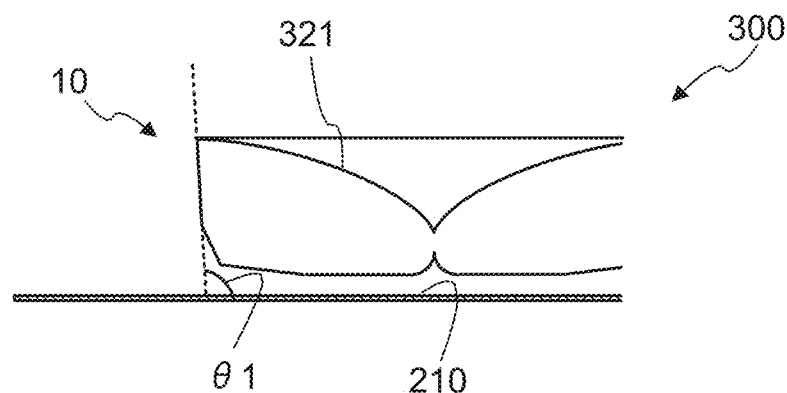
Figure 7C:
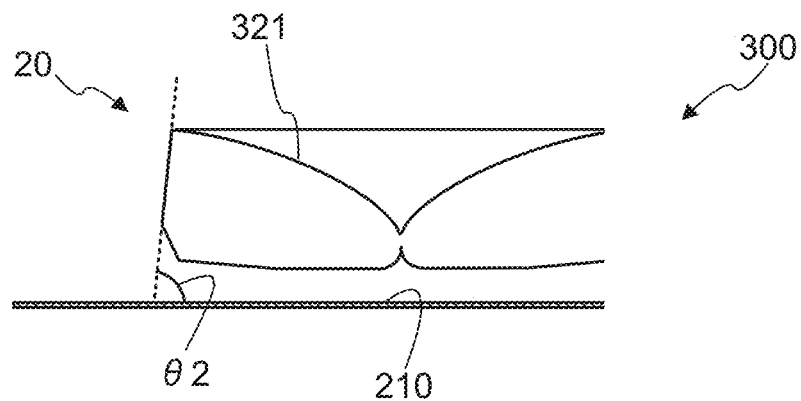

The magnitude relationship between the above two inclination angles may be reversed in another embodiment (second embodiment) as illustrated in FIGS. 7A to 7C. That is, minimum angle θ1 of the first inclination angle may be larger than minimum angle θ2 of the second inclination angle, where the first inclination angle is the inclination angle of a side surface adjacent to the front side in the side surface in corner portion 10 respect to the substrate, and the second inclination angle is the inclination angle of the side surface adjacent to the front side in the side surface in side portion 20 with respect to the substrate. In such a case, minimum angle θ1 of the first inclination angle of corner portion 10 is preferably 70 to 120°, and minimum angle θ2 of the second inclination angle of side portion 20 is preferably 60 to 110°. When the reflection surface in the present invention reflects light incident on the incidence surface in the lateral direction substantially parallel to the substrate in such a way that the reflected light travels away from the optical axis of the light emitting element, minimum angle $\theta1$ of the first inclination angle of the front side part of the side surface in corner portion 10 is preferably 95 to 120°, and minimum angle $\theta2$ of the second inclination angle of the front side part of the side surface in side portion 20 is preferably 60 to 110°. It is preferable that the following relational expression is satisfied. That is, the expression $-2° \geq$ the minimum angle of the second inclination angle— the minimum angle of the first inclination angle $\geq -30°$ is preferably satisfied. The above configuration allows light emitted from corner portion 10 to reach light diffusion plate surface at a region close to light flux controlling member 300, thereby preventing a decrease in the luminance of a region corresponding to corner portion 10 on the light emitting surface (light diffusion plate 120) of surface light source device 100.

In the second embodiment, minimum angle $\theta1$ of the first inclination angle of the side surface in corner portion 10 may be greater than 90°. Increasing minimum angle $\theta1$ of the first inclination angle allows large amount of light to reach light diffusion plate 120 at a region close to light flux controlling member 300, thereby preventing a decrease in the luminance of a region corresponding to corner portion 10 on the light emitting surface (light diffusion plate 120) of surface light source device 100.

(Light Distribution)

Figure 8A:
FIGS. 8A and 8B illustrate optical paths in a light emitting device according to the embodiment.
Figure 8B:

FIG. 8A illustrates optical paths of light emitted from corner portion 10 of light flux controlling member 300, and FIG. 8B illustrates optical paths of light emitted from side portion 20 of light flux controlling member 300.

In light flux controlling member 300 according to the present embodiment, a part of the light emitted from corner portion 10 reaches the diffusion and reflection surface (the inner surface of bottom plate 112 of casing 110 or the surface of substrate 210 disposed on the inner surface) at a region close to light flux controlling member 300, as illustrated in FIG. 8A. This is because minimum angle $\theta1$ of the first inclination angle of the side surface in corner portion 10 is comparatively small. Such a configuration is capable of preventing a decrease in the luminance of a region corresponding to corner portion 10 on the light emitting surface (light diffusion plate 120) of surface light source device 100.

Most of the light emitted from side portion 20 reaches the diffusion and reflection surface or light diffusion plate 120 at a region far from light flux controlling member 300, as illustrated in FIG. 8B. This is because minimum angle $\theta2$ of the second inclination angle of the side surface in side portion 20 is comparatively large (close to 90°).

(Illuminance Distribution)

In order to confirm the effect of light flux controlling member 300 according to the present embodiment, the illuminance distribution on the back surface of light diffusion plate 120 (the surface on the light emitting device 200 side) was measured in surface light source device 100 including light flux controlling members 300 according to the present embodiment and in a surface light source device including light flux controlling members according to a comparative example.

Figure 9A:
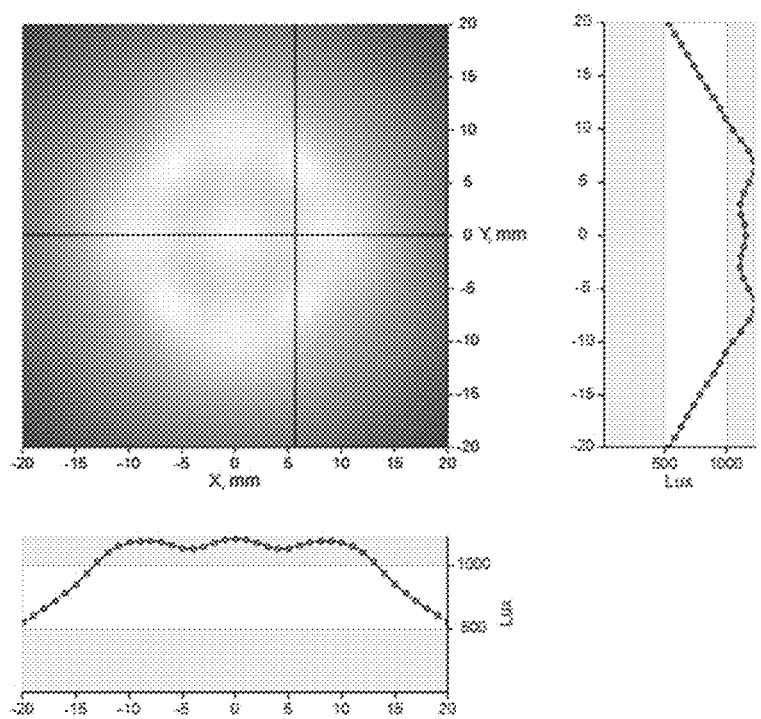
FIG. 9A illustrates the illuminance distribution in a surface light source device according to a comparative example.
Figure 9B:
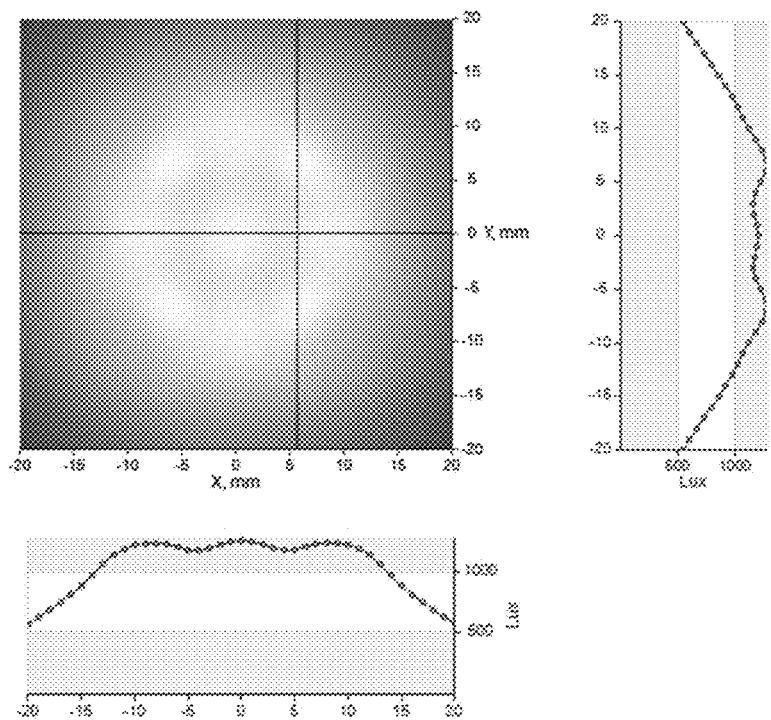
FIG. 9B illustrates the illuminance distribution in the surface light source device according to the embodiment.

FIG. 9A illustrates the illuminance distribution in the surface light source device according to the comparative example. In the light flux controlling member in the surface Light source device of FIG. 9A, the shape of the side surface in corner portion 10 viewed in cross section and the shape of side surface in side portion 20 viewed in cross section are the same. FIG. 9B illustrates the illuminance distribution in surface light source device 100 according to the embodiment. In light flux controlling member 300 in surface light source device 100 of FIG. 9B, the shape of the side surface in corner portion 10 viewed in cross section and the shape of side surface in side portion 20 viewed in cross section are different as illustrated in FIGS. 8A and 8B.

FIGS. 9A and 9B show the illuminance distribution on light diffusion plate 120 when only the four light emitting elements 220 included in one light emitting device 200 are turned on in the surface light source device. In FIGS. 9A and 9B, the lower graphs each show the illuminance distribution in the lateral direction between two upper light emitting elements 220 and two lower light emitting elements 220, and the right graphs each show the illuminance distribution in the vertical direction passing through the light emitting centers of two right light emitting elements 220.

The comparison between FIGS. 9A and 9B indicates that the illuminance in the region corresponding to corner portion 10 is comparatively low in the surface light source device according to the comparative example, but the illuminance in the region corresponding to corner portion 10 is high in surface light source device 100 according to the present embodiment.

(Effects)

In light flux controlling member 300 of the present embodiment, the shape of the side surface when light flux controlling member 300 is viewed in cross section differs between the corner portion and the side portion, and the light distribution characteristics can be changed between the corner portion and the side portion. Such a configuration is capable of reducing the generation of luminance unevenness in a surface light source device.

INDUSTRIAL APPLICABILITY

The light flux controlling member, the light emitting device and the surface light source device according to the present invention may be applied to, for example, a backlight of a liquid crystal display device and general-purpose lighting.

REFERENCE SIGNS LIST

10 Corner portion
20 Side portion
100 Surface light source device
100' Display device
102 Display member
110 Casing
112 Bottom plate
114 Top plate
120 Light diffusion plate
200 Light emitting device
210 Substrate
220 Light emitting element
300 Light flux controlling member
310 Incidence unit
320 Incidence surface
321 First reflection surface
330 Emission unit
332 Second reflection surface
333 First emission surface
340 Emission promoting part
CA Central axis
OA Optical axis

The invention claimed is:

1. A light flux controlling member for controlling a distribution of light emitted from a plurality of light emitting elements disposed on a substrate, the light flux controlling member comprising:
   a plurality of incidence units for allowing incidence of the light emitted from the plurality of light emitting elements, respectively; and
   an emission unit disposed between the plurality of incidence units in a direction along the substrate, the emission unit allowing emission of the light incident on the plurality of incidence unite while guiding the light,
   wherein the plurality of incidence units each include:
      an incidence surface disposed on a back side of the light flux controlling member, the incidence surface allowing incidence of the light emitted from the light emitting element, and
      a reflection surface disposed on a front side of the light flux controlling member at a position facing the light emitting element with the incidence surface interposed between the reflection surface and the light emitting element, the reflection surface reflecting, in a lateral direction, the light incident on the incidence surface in such a way that the reflected light travels away from an optical axis of the light emitting element,
   wherein the light flux controlling member has a rectangular shape with rounded corners in plan view, and includes four corner portions and four side portions,
   wherein a minimum angle of a first inclination angle is different from a minimum angle of a second inclination angle, the first inclination angle being, with respect to the substrate, an inclination angle of a side surface adjacent to the front side in a side surface of the light flux controlling member when the corner portion is observed in a cross section including the optical axis, the second inclination angle being, with respect to the substrate, an inclination angle of the side surface adjacent to the front side in the side surface of the light flux controlling member when the side portion is observed in a cross section including the optical axis,
   wherein the minimum angle of the first inclination angle is smaller than the minimum angle of the second inclination angle, and
   wherein the following expression is satisfied:
   $2° \leq$ the minimum angle of the second inclination angle— the minimum angle of the first inclination angle $\leq 30°$.

2. A light flux controlling member for controlling a distribution of light emitted from a plurality of light emitting elements disposed on a substrate, the light flux controlling member comprising:
   a plurality of incidence units for allowing incidence of the light emitted from the plurality of light emitting elements, respectively; and
   an emission unit disposed between the plurality of incidence units in a direction along the substrate, the emission unit allowing emission of the light incident on the plurality of incidence units while guiding the light,
   wherein the plurality of incidence units each include:
      an incidence surface disposed on a back side of the light flux controlling member, the incidence surface allowing incidence of the light emitted from the light emitting element, and
      a reflection surface disposed on a front side of the light flux controlling member at a position facing the light emitting element with the incidence surface interposed between the reflection surface and the light emitting element, the reflection surface reflecting, in a lateral direction, the light incident of the incidence surface in such a way that the reflected light travels away from an optical axis of the light emitting element,
   wherein the light flux controlling member has a rectangular shape with rounded corners in plan view, and includes four corner portions and four side portions,
   wherein a minimum angle of a first inclination angle is different from a minimum angle of a second inclination angle, the first inclination angle being, with respect to the substrate, an inclination angle of a side surface adjacent to the front side in a side surface of the light flux controlling member when the corner portion is observed in a cross section including the optical axis, the second inclination angle being, with respect to the substrate, an inclination angle of the side surface adjacent to the front side in the side surface of the light flux controlling member when the side portion is observed in a cross section including the optical axis,
   wherein the minimum angle of the first inclination angle is larger than the minimum angle of the second inclination angle, and
   wherein the following expression is satisfied:
   $-2° \geq$ the minimum angle of the second inclination angle— the minimum angle of the first inclination angle $-30°$.

3. A light emitting device, comprising:
   a plurality of light emitting elements disposed on a substrate; and
   the light flux controlling member according to claim 1 disposed above the plurality of light emitting elements.

4. A surface light source device, comprising:
   a plurality of the light emitting devices according to claim 3; and
   a light diffusion plate that transmits light emitted from the plurality of light emitting devices while diffusing the light.

5. A display device, comprising:
   the surface light source device according to claim 4; and
   a display member to be illuminated with light emitted from the surface light source device.

6. A light emitting device, comprising:
   a plurality of light emitting elements disposed on a substrate; and
   the light flux controlling member according to claim 2 disposed above the plurality of light emitting elements.

7. A surface light source device, comprising:
   a plurality of the light emitting devices according to claim 6; and
   a light diffusion plate that transmits light emitted from the plurality of light emitting devices while diffusing the light.

8. A display device, comprising:
   the surface light source device according to claim 7; and
   a display member to be illuminated with light emitted from the surface light source device.

* * * * *